(No Model.) 3 Sheets—Sheet 1.
C. E. EMERY.
Steam Meter.
No. 242,521. Patented June 7, 1881.
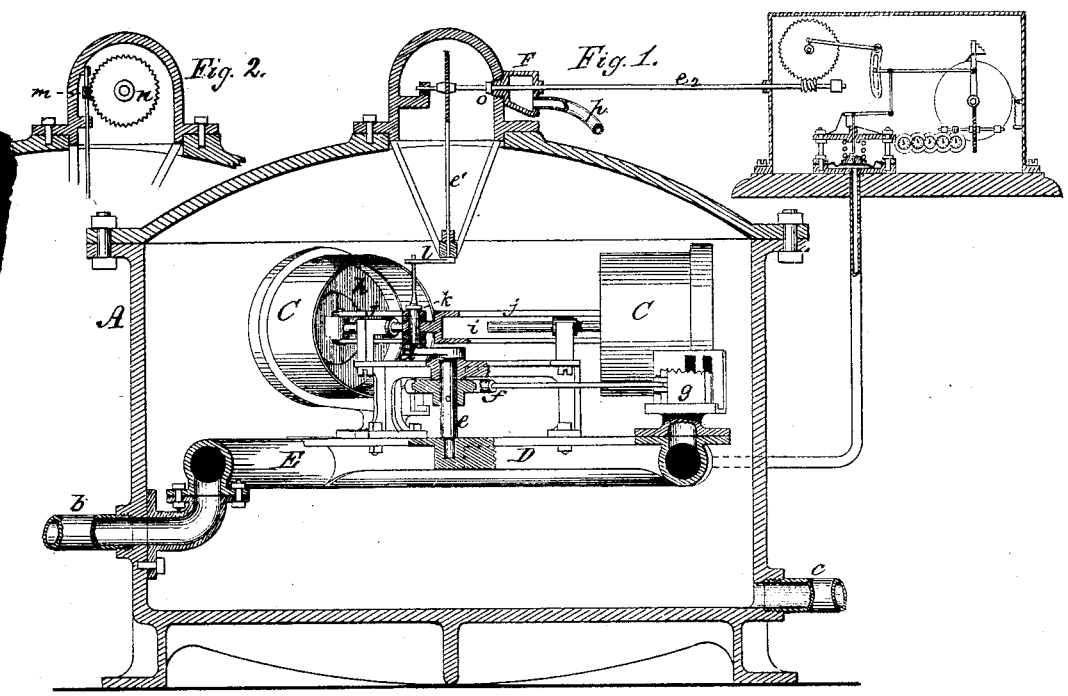
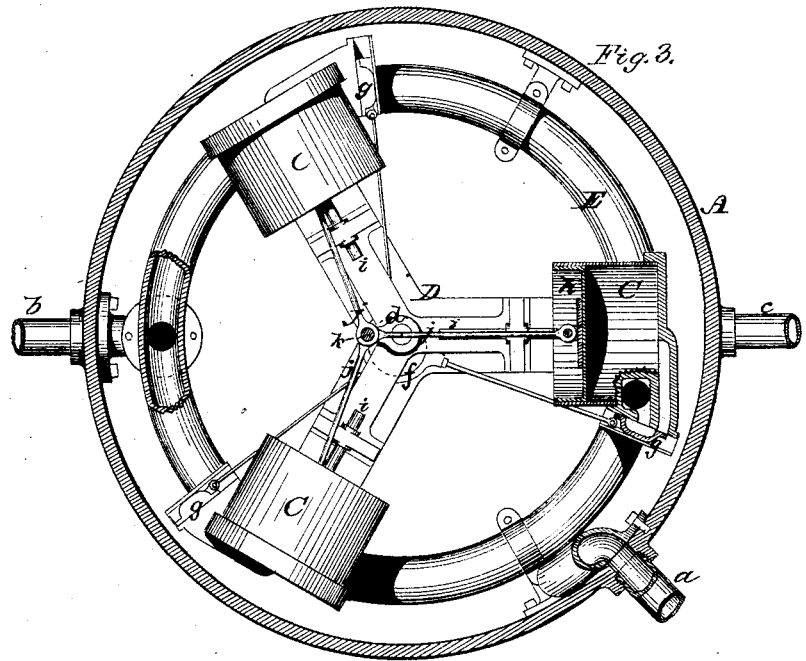
Witnesses:
J. B. White
R. E. Rockwell
Inventor:
Chas. E. Emery (No Model.)

3 Sheets—Sheet 2.

C. E. EMERY.
Steam Meter.

No. 242,521. Patented June 7, 1881.

Witnesses:
J. B. White
R. E. Rockwell

Inventor:
Chas. E. Emery.

(No Model.) 3 Sheets—Sheet 3.
C. E. EMERY.
Steam Meter.
No. 242,521. Patented June 7, 1881.
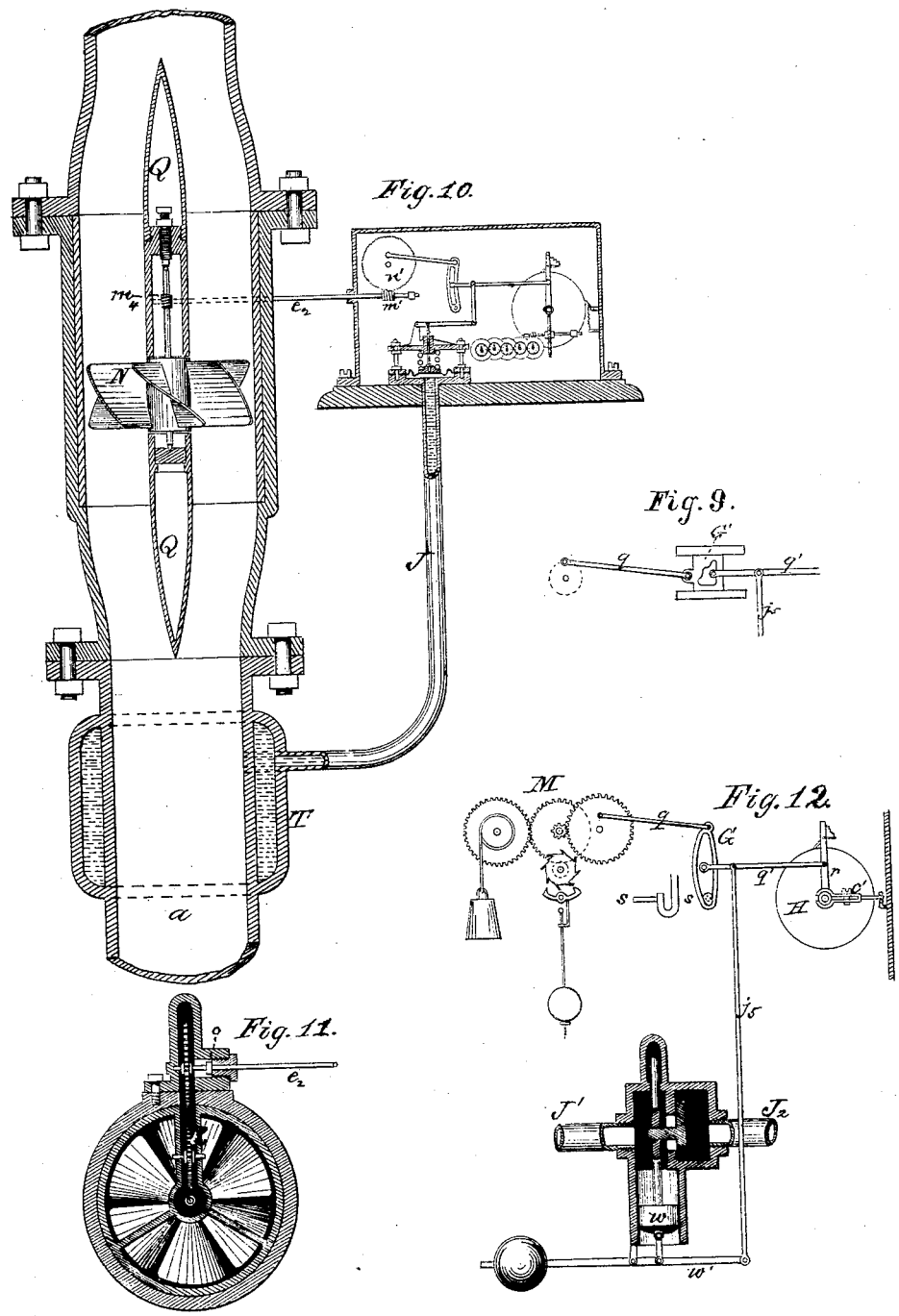
Witnesses:
Inventor:
Chas. E. Emery

UNITED STATES PATENT OFFICE.

CHARLES E. EMERY, OF BROOKLYN, NEW YORK.

STEAM-METER.

SPECIFICATION forming part of Letters Patent No. 242,521, dated June 7, 1881.

Application filed May 12, 1880. (No model.)

*To all whom it may concern:*

Be it known that I, CHARLES E. EMERY, of the city of Brooklyn, in the county of Kings and State of New York, (office New York city,) have invented certain new and useful Improvements in Steam-Meters; and I do hereby declare that the following is a full, clear, and exact description of the same, reference being had to the accompanying drawings, making part of the specification.

Steam being an elastic fluid, its density or weight per unit of volume varies very nearly with its absolute pressure—that is, to its pressure with the atmospheric pressure added. To measure steam accurately, then, requires that its volume be measured at a constant known pressure, or, if the pressure be variable, that the record of the measurement be corrected to correspond to the changes of density.

This invention relates to apparatus for measuring the volume of steam and for automatically correcting the record of the volume to correspond to the changes of density due to the changes of pressure, the apparatus for measuring the volume being also well adapted for that purpose when by any means the pressure is kept substantially constant. The apparatus is also adapted to measure any other elastic fluid than steam, and portions of the same are equally well adapted for measuring non-elastic fluids.

The invention relates specifically to the details of a three-cylinder engine arranged in a chamber and adapted to measure fluid, also to a compensating apparatus adapted to automatically vary the rate of motion of the indices with the varying density or temperature of the fluid.

Figure 4:
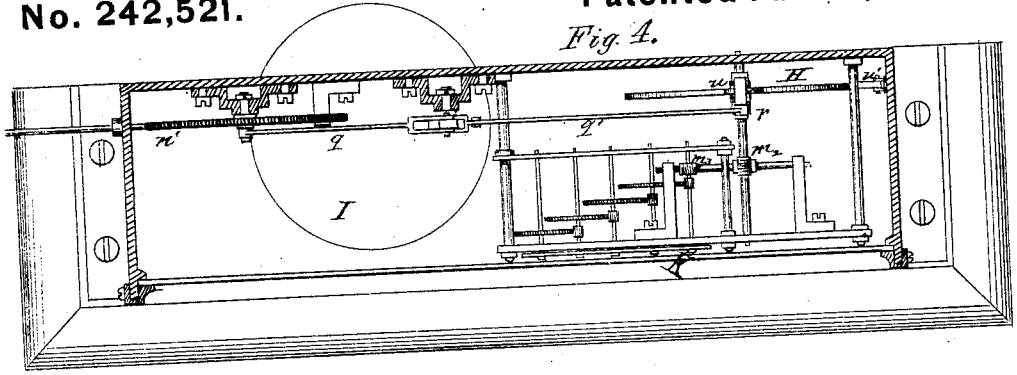
Figures 7, 8:
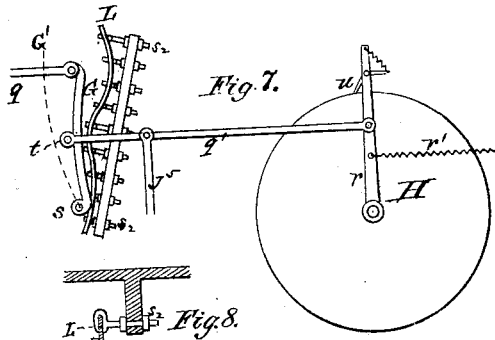

In the drawings, Figure 1 represents a vertical section through the center of the case of a displacement-meter with three cylinders, adapted for the measurement of steam. Fig. 2 is a transverse section of the upper part of the case. Fig. 3 is a horizontal section through the case, showing a plan view of the three cylinders and connections, with small portions in section. Fig. 4 is a plan view; and Fig. 5 a vertical elevation, partly in section, of the apparatus for adjusting the rate of motion of the indices to the density of the steam. Fig. 6 shows an improved form of the link-motion shown in Figs. 4 and 5. Fig. 7 is a modification of the same. Fig. 8 is a horizontal section of part of the devices shown in Fig. 7. Fig. 9 is another modification of Fig. 6. Fig. 10 is a vertical section of an inferential meter adapted for the measurement of steam, shown in combination with the density-index-adjusting apparatus, also in combination with a thermostat, so that the rate of motion of the indices may be varied with the temperature instead of the pressure, if desired. Fig. 11 is a horizontal section of the same. Fig. 12 shows the application of the improved form of link to a meter which approximately measures the flow by recording the position of a valve regulating the size of an opening.

In Figs. 1 and 3, A represents a strong case designed to inclose any form of displacement-meter. The steam enters at an inlet-opening, $a$, and surrounds the meter, maintaining the latter at a constant temperature, so that the pistons will not stick in the cylinders from unequal expansion. The steam, after it has put the meter in motion, passes off through the delivery-pipe $b$.

Preferably the meter is arranged to work the water of condensation through it after the latter reaches a certain level, so that the upper part of the case A is filled with steam. This is accomplished by placing the cylinder-valves $g g g$ near the bottom of the cylinders, as shown. A steam-chest may be added and the pipe run below the level of the cylinder. The inlet-pipe $a$ is preferably turned sidewise and downward to throw the steam, water of condensation, and dirt against the side of the case, so that the latter will separate from the steam and settle to the bottom, where the solid matter can be blown out with the water at intervals through the pipe $c$. The meter may, however, be run in the open air by attaching inlet and outlet pipes, as in any ordinary engine or meter; but the described arrangement is better, from the fact that there are no external stuffing-boxes for the principal working parts, thus reducing friction and the liability to leak. In this particular case a meter is shown with three horizontal cylinders, C C C, set radially one hundred and twenty degrees apart, with pistons $h$ connected to one crank, $d$, on a vertical shaft, $e$, which shaft also carries an eccentric, $f$, operating distributing-valves $g g g$ on the several cylinders. The cylinders are supported on

side of the link is provided, so that the pin $t$, rod $q'$, and pawl-lever $r$ are moved in one direction only, and the retraction of these parts is performed by a spring, $r'$. The pin $t$ is extended beyond the link G, so as to touch during the retracting movement a cam, L, which in this case is shown made like an elastic spring, which can be flexed to any desired curve by a number of adjusting-screws, $s^2$ $s^2$, with slotted heads to receive the spring, said screws being attached to a rib on the framing. The effect is that, if the cam G permit, the pin $t$ will take the full movement due to its position on lever or link G; but if said cam stop the movement of the pin $t$, so that the link goes on and leaves it, the throw of pawl $u$ and movement of ratchet-wheel H will be diminished, and by giving surplus movement to the connecting-rod $q$ the shape of the cam L may be modified so as to give very different degrees of movement from those due to the simple lever. For instance, if the link G at its extreme movement to the left occupied the dotted curve G', and the cam L were set to the same curve, the pin would at all times rest against the cam, and no motion be given to pin $t$ and the pawl-lever $r$, and in any case the amount of motion given the pawl-lever $r$ for different actual positions of pin $t$ will be dependent upon the shape of the cam L. This cam L need not be adjustable, but a simple plate with outline adapted to limit the movement of pin $t$ after the proper outline has been ascertained in any manner. Still further adjustment may be made by varying the position of the fulcrum $s$ in relation to the cam L—for instance, by lowering the fulcrum $s$ so that the lever or link G will have nearly the same movement at both ends of the cam L. The fulcrum may also be dispensed with and the lever or link carried in a slide, so that both ends will have the same movement, the same as in Fig. 9.

The devices shown in Figs. 6 and 7 are equivalent in that the variation of the rate of motion is secured by lost motion in each case. In Fig. 6 the lost motion is the space between the pin and the two sides of the slot on the link. In Fig. 7 the lost motion between the pin and link is insured by the former striking a cam, G. In either case, at any point where the full throw of the link would cause an excessive movement of indices, the slack or lost motion may, by means described, be increased and the error adjusted.

The link G may be given the traversing movement, (up and down, per drawings,) and the pin $t$ not traversed, or traversed in a reverse direction, if desired, a relative movement of the link and pin only being required.

In Fig. 12 the improvement shown in Fig. 6 is applied to a meter on the Holly principle, in which the flow is estimated from the extent of opening of a slide-valve, $v$, adjusted by a regulating-piston, $w$, to keep a constant pressure in the pipe $J^2$ at the right. These meters are inaccurate, for the reason that the flow is not proportioned directly to the movement of the valve.

I propose to use clock-work M to operate a link, G, which, through a radius-arm, $q'$, moves a pawl-arm, $r$, and ratchet-wheel H, the radius-arm $r$ being adjusted vertically in the link by a rod, $j^5$, attached to the lever $w'$ of the regulating-valve, all substantially as has been done before, except that I would use one of the methods shown in Figs. 6 and 7 to correct the error, the second method being illustrated—that is, slack motion is to be provided in the link G at points where the delivery is found to be recorded in excess when using an ordinary curved link, and the indices or index error adjusted so that the reading may be referred to any unit.

By either of the methods shown in Figs. 6 and 7 inaccuracies of all kinds in either of the kinds of apparatus may be adjusted by trial—such, for instance, as those due to the variation in the rate of movement of the diaphragm of the steam-gage at different pressures. The proper shape of link for the apparatus shown in Fig. 12 may also be determined approximately by mathematical calculations founded on what is called the "mean hydraulic depth" of the varying orifice.

The recording apparatus described is applicable with any form of fluid-meter.

Figure 5:
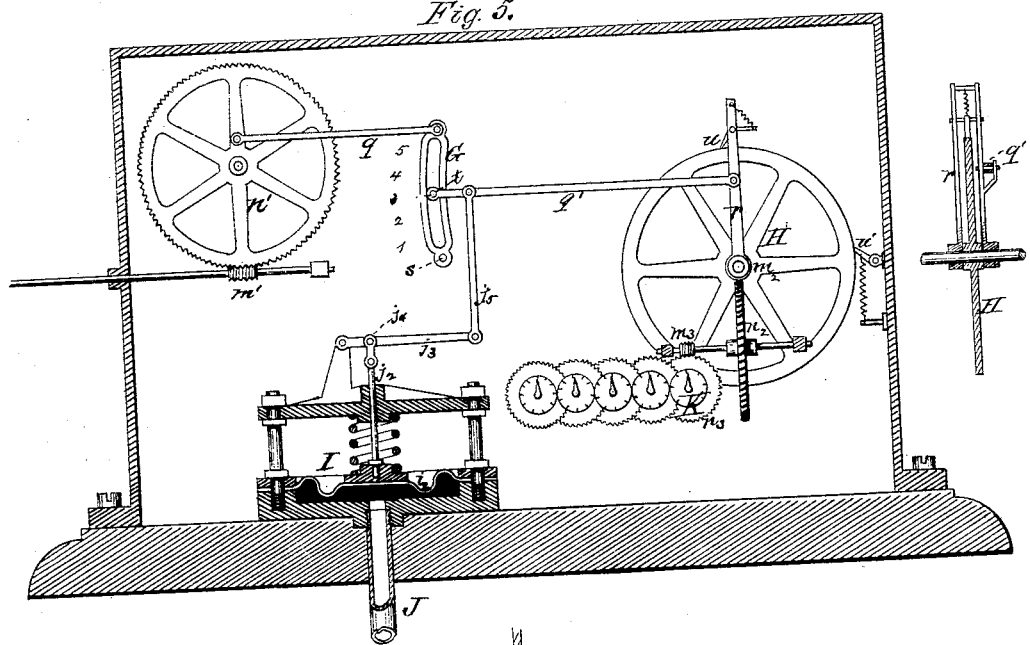
Figure 6:
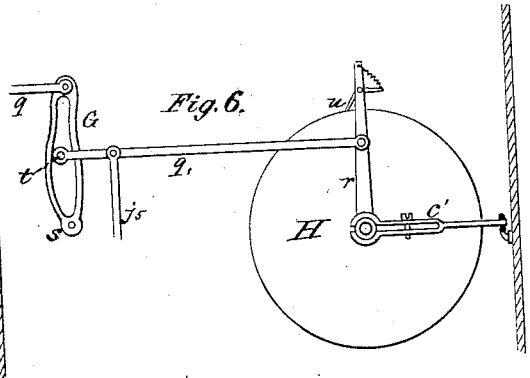

In Figs. 10 and 11 the apparatus shown in Figs. 4 and 5 is represented as applied to an inferential meter consisting of a screw-propeller, N, arranged in a pipe, $a$, so as to be revolved by the passage of fluid. The propeller has bearings in stationary cone-pieces Q, centered by wings in the pipe, one wing, R, being hollow and containing two spur-gears engaging together, one receiving motion from a worm, $m^4$, on the shaft of screw N, the other carrying a shaft, $e^2$, provided with a collar, $o$, as previously described in relation to Fig. 1, said shaft driving the indicating apparatus shown similar to that in Fig. 5, previously described.

The steam gage-pipe J may with any kind of meter either be connected directly to the main pipe $a$, to show the pressure of the steam measured, or, as shown in Fig. 10, may connect to a chamber, T, containing fluid heated by the steam in main pipe, so as in effect to form a thermostat.

In Fig. 10 the chamber T is annular and surrounds the main pipe. If the chamber T be partially filled with a vaporizing fluid, it will, by receiving heat from the pipe, be vaporized sufficiently to operate the gage I at the pressure due to the temperature. The chamber T may also be entirely filled with fluid—oil, for instance—the expansion of which under heat will move the gage. A portion of main pipe $a$ may also be anchored at one end, and the other end connected directly to the rod $j^2$, Fig. 5, and thereby impart to such rod the movement due to the contraction and expansion of the pipe conveying the heated fluid. By these means the apparatus may be made to vary the motion of indices in accordance with the temperature of the fluid measured, and thus give a record of the heating effect based both upon the quantity and temperature of the fluid, being therefore specially applicable for the measurement of hot water circulated for heating purposes, it being understood that this thermostatic regulating device is applicable to any form of meter—that shown in Fig. 1, for instance—or to either modification of the regulating device shown in Figs. 5, 6, or 7.

What I claim as my invention, and desire to secure by Letters Patent, is—

1. In a displacement-meter inclosed in a case, cylinder-heads provided with valve-seats at the sides and near the bottoms of cylinders, thus providing for carrying off the water of condensation with the steam and preventing any tendency of the valve to fall away from the seat by gravity.

2. In combination with three or more single-acting engines connected to the same shaft and exhaust-pipe, a case, A, surrounding the engines, provided with an inlet-pipe, and having a connection through the case to the exhaust-pipe.

3. The pipe-frame E, with radial branches D, in combination with three or more cylinders, C, provided with suitable valves and connections.

4. In an apparatus for measuring fluids, a gage or indicator operated by the change of pressure or temperature of fluid measured, combined with indices for recording the volume, and with devices, substantially as described, adapted to change the rate of motion of said indices with the variation of pressure or temperature.

5. A link or arm, G, operated by a meter, combined with a pin, t, or equivalent, traversing such link, and connected to operate the indices of the meter through a ratchet movement, when slack motion is insured between the pin and link to permit changing the rate of motion of the indices at different parts of the traversing movement.

CHAS. E. EMERY.

Witnesses:
J. B. WHITE,
R. E. ROCKWELL.